United States Patent [19]
Koga et al.

[11] Patent Number: 5,099,315
[45] Date of Patent: Mar. 24, 1992

[54] CIRCUIT FOR SEPARATING LUMINANCE AND CHROMINANCE SIGNALS FROM A COMPOSITE VIDEO SIGNAL

[75] Inventors: Takashi Koga; Toshikazu Fujii, both of Kanagawa, Japan

[73] Assignee: Kabushiki Kaisha Toshiba, Kanagawa, Japan

[21] Appl. No.: 575,009

[22] Filed: Aug. 30, 1990

[30] Foreign Application Priority Data

Aug. 30, 1989 [JP] Japan .................. 1-223486

[51] Int. Cl.⁵ ............................. H04N 9/78
[52] U.S. Cl. ............................. 358/31; 358/22
[58] Field of Search ...................... 358/31, 22

[56] References Cited

U.S. PATENT DOCUMENTS

| | | | |
|---|---|---|---|
| 4,050,084 | 9/1977 | Rossi | 358/31 |
| 4,703,342 | 10/1987 | Takahashi | 358/31 |
| 4,843,457 | 6/1989 | Yamagata | 358/31 |
| 4,984,737 | 12/1990 | Umezawa | 358/31 |

FOREIGN PATENT DOCUMENTS

| | | |
|---|---|---|
| 58-10913 | 2/1983 | Japan . |
| 63-46088 | 2/1988 | Japan . |
| 63-59594 | 11/1988 | Japan . |

Primary Examiner—James J. Groody
Assistant Examiner—Kim Yen Vo
Attorney, Agent, or Firm—Finnegan, Henderson, Farabow, Garrett and Dunner

[57] ABSTRACT

A Y/C separation circuit for separating the Y and C components of a composite video signal having a horizontal scan period, which includes an input circuit for receiving the composite video signal, a first delay which receives the composite video signal and delays the composite video signal by an amount equal to an integer times the horizontal scan period, a second delay which receives the delayed output signal from the first delay and delays delayed output signal by an amount equal to an integral plus one times the horizontal scan period, a C component extraction circuit which receives the composite video signal and the output from the first and second delays and outputs a C component signal representing the C component of the composite video signal and a Y component extraction circuit which receives the composite video signal from the input circuit and the C component signal from the C component extraction circuit and generates a Y component signal representing the Y component of the composite video signal by subtracting the C component signal from the composite video signal.

7 Claims, 14 Drawing Sheets

CIRCUIT FOR SEPARATING LUMINANCE AND CHROMINANCE SIGNALS FROM A COMPOSITE VIDEO SIGNAL

FIELD OF THE INVENTION

The present invention relates generally to a Y/C separation circuit, and more particularly, to a Y/C separation circuit for color TV sets.

BACKGROUND OF THE INVENTION

Some examples of the conventional Y/C separation circuits will be described hereinbelow, in reference to FIGS. 1, 2, 3 and 4. Through the drawings, the same reference numerals or letters will be used to designate like or equivalent elements for simplicity of explanation.

FIG. 1 shows a typical example of a conventional Y/C separation circuit employing a comb filter configuration. In FIG. 1, a composite NTSC system video signal is applied to an adder 20, a subtractor 22 and a 1H delayer 24 through an input terminal 26. The composite video signal includes a luminance signal Y component and a chrominance signal C component. These components Y and C are modulated by a color sub-carrier frequency.

The 1H delayer 24 delays the composite video signal for a 1H period (H represents one horizontal scanning period). The 1H delay signal of the composite video signal obtained by the 1H delayer 24 is applied to both the adder 20 and the subtractor 22. The adder 20 adds the direct signal and the 1H delay signal of the composite video signal from the input terminal 26 and the 1H delayer 24, respectively, with each other. The subtractor 22 carries out a subtraction between the direct signal and the 1H delay signal of the composite video signal. Here, the frequency of the color sub-carrier frequency is an odd number times a half of the horizontal frequency. The phase of the color sub-carrier is inversed for every 1H period. The phase of the chrominance signal C is also inversed for every 1H period. Thus, the chrominance signal C components offset each other when the direct signal and the 1H delay signal of the composite video signal are added with each other in the adder 20. Thus, only the luminance signal Y component is left in the composite video signal. The luminance signal Y component thus left is output through a Y output terminal 28.

On the other hand, the luminance signal Y components offset each other when the direct signal and the 1H delay signal of the composite video signal are subtracted from each other in the subtractor 22. Thus, only the chrominance signal C component is left in the composite video signal. The chrominance signal C component thus left is output through a C output terminal 30.

In the typical example as mentioned above, the Y/C separation is carried out using the characteristics of the composite video signal of the NTSC system such that the luminance signal Y component has a strong correlation in the vertical direction and the phase of the chrominance signal C inverses for every 1H period.

For example, in case of vertical stripes which completely correlate with the luminance signal Y in the vertical direction, the Y/C separation can certainly be made by the circuit described above. However, where the composite video signal suddenly changes in the vertical direction, the Y/C separation using the comb filter malfunctions. That is, when the chrominance signal C changes suddenly, this signal change affects causes a dot disturbance in the luminance signal Y. When the luminance signal Y changes suddenly, this signal change also causes a cross-color distortion in the chrominance signal C.

In the conventional Y/C separation circuit, it is possible to determine whether the composite video signals on two adjacent horizontal scanning lines have a correlation with each other. However, it is impossible to effect the Y/C separation in the case where the composite video signals on two adjacent horizontal scanning lines have less correlation with each other in the vertical direction. So, further attempts to solve the problem have been made, employing two 1H delayers in such a comb filter.

FIG. 2 shows a second example of the conventional Y/C separation circuit which is disclosed in the Japanese Laid-open Patent Application P58-10913.

In FIG. 2, a composite video signal is applied to a minimum value detection circuit (referred to as MIN detector hereafter) 32, a maximum value detection circuit (referred to as MAX detector hereafter) 34 and a first 1H delayer 24a through an input terminal 26. The first 1H delayer 24a delays the composite video signal by 1H period. The output of the first 1H delayer 24a, i.e., the 1H delay signal of the composite video signal is applied to a second 1H delayer 24b, the MIN detector 32, the MAX detector 34, a first subtractor 36 and a second subtractor 38. The second 1H delayer 24b further delays the 1H delay signal of the composite video signal. The output of the second 1H delayer 24b, i.e., the 2H delay signal of the composite video signal is applied to the MIN detector 32 and the MAX detector 34.

The MIN detector 32 detects a minimum value of its three inputs, i.e., the direct signal, the 1H delay signal and the 2H delay signal of the composite video signals, which are supplied from the input terminal 26, the 1st 1H delayer 24a and the second 1H delayer 24b. The minimum value output (referred to as MIN signal hereafter) of the MIN detector 32 is applied to the first subtractor 36.

The MAX detector 34 detects a maximum value of its three inputs, i.e., the direct signal, the 1H delay signal and the 2H delay signal of the composite video signals, which are also supplied from the input terminal 26, the 1st 1H delayer 24a and the second 1H delayer 24b. The maximum value output (referred to as MAX signal hereafter) of the MAX detector 34 is applied to the second subtractor 38.

The first subtractor 36 carries out a subtraction between the MIN signal and the 1H delay signal of the composite video signal from the MIN detector 32 and the first 1H delayer 24a. The second subtractor 38 carries out a subtraction between the MAX signal and the 1H delay signal of the composite video signal from the MAX detector 34 and the first 1H delayer 24a. Difference signals output from the first and second subtractors 36 and 38 are applied to an adder 40. Thus, the adder 40 adds the difference signals with each other. A sum signal output from the adder 40 consists of a vertical non-correlative component, i.e., the chrominance signal C component of the composite video signal. This chrominance signal C component is supplied to a C output terminal 30 through an attenuator 42. The attenuator 42 attenuates the level of the chrominance signal C component output from the adder 40 to a predetermined level.

The chrominance signal C component and the 1H delay signal of the composite video signal from the attenuator 42 and the first 1H delayer 24a are applied to a third subtractor 44. Thus, the third subtractor 44 carries out a subtraction between the chrominance signal C component and the 1H delay signal of the composite video signal. The chrominance signal C component of the 1H delay signal of the composite video signal is offset by the chrominance signal C component from the attenuator 42 in the third subtractor 44. Thus, only the luminance signal Y component is left in the composite video signal. The luminance signal Y component thus left is output through a Y output terminal 28.

In this second conventional Y/C separation circuit, as shown in FIG. 2, the ability of detecting the correlation between two adjacent horizontal line signals has been improved by using two 1H delayers, i.e., the first and second 1H delayers 24a and 24b. As a result, the luminance signal Y component and the chrominance signal C component are certainly separated for non-correlative components in the vertical direction, reducing the dot disturbance and the cross-color distortion.

FIG. 3 shows a third example of the conventional Y/C separation circuit which is disclosed in the Japanese Laid-open Patent Application P63-59594.

In FIG. 3, a composite video signal is applied to a first comb filter consisting of a first 1H delayer 24a and a first subtractor 36, through an input terminal 26. The first 1H delayer 24a delays the composite video signal by 1H period. The output of the first 1H delayer 24a, i.e., the 1H delay signal of the composite video signal is applied to the first subtractor 36. The first subtractor 36 carries out a subtraction between the direct signal and the 1H delay signal of the composite video signal. A first difference signal output from the first subtractor 36 is applied to a correlation detector 46.

Further the 1H delay signal of the composite video signal from the first 1H delayer 24a is applied to a second comb filter consisting of a second 1H delayer 24b and a second subtractor 38. In the second comb filter, the 1H delay signal of the composite video signal is applied to both the second 1H delayer 24b and the second subtractor 38. The second 1H delayer 24b further delays the 1H delay signal of the composite video signal from the first 1H delayer 24a by 1H period. The output of the second 1H delayer 24b, i.e., the 2H delay signal of the composite video signal is also applied to the second subtractor 38. The second subtractor 38 carries out a subtraction between the 1H delay signal and the 2H delay signal of the composite video signal. A second difference signal output from the second subtractor 38 is applied to the correlation detector 46 through an inverter 48.

The correlation detector 46 detects a signal representing a correlation between the first and second difference signals. If these two difference signals have the same polarity, the correlation detector 46 outputs a correlation signal with less amplitude in either one of the two inputs. As seen from the above description, this situation corresponds to the case of the chrominance signal C component. If these two difference signals are opposite in phase, the correlation detector 46 fails to output the correlation signal. In other words, the level of the correlation signal becomes zero. This situation corresponds to the case of the luminance signal Y component. Thus, the correlation detector 46 selectively derives the chrominance signal C component. The chrominance signal C component is output through a C output terminal 30.

Further the chrominance signal C component derived from the correlation detector 46 is applied to a third subtractor 44. The 1H delay signal of the composite video signal from the first 1H delayer 24a is also applied to the third subtractor 44. Thus, the third subtractor 44 carries out a subtraction between the chrominance signal C component and the 1H delay signal of the composite video signal. The chrominance signal C component of the 1H delay signal of the composite video signal is offset by the chrominance signal C component from the correlation detector 46 in the third subtractor 44. Thus, only the luminance signal Y component is left in the composite video signal. The luminance signal Y component thus left is output through a Y output terminal 28.

FIG. 4 shows a fourth example of conventional Y/C separation circuit which is disclosed in the Japanese Laid-Open Patent Application P63-46088.

In FIG. 4, a composite video signal is applied to a first comb filter consisting of a first 1H delayer 24a and a first subtractor 36, through an input terminal 26. The first 1H delayer 24a delays the composite video signal by 1H period. The output of the first 1H delayer 24a, i.e., the 1H delay signal of the composite video signal is applied to the first subtractor 36. The first subtractor 36 carries out a subtraction between the direct signal and the 1H delay signal of the composite video signal. A first difference signal output from the first subtractor 36 is applied to a first controllable resistor 50 which will be described later. The first difference signal represents a first signal of the chrominance signal C component.

Further the direct signal and the 1H delay signal of the composite video signal are applied to a first adder 52. The first adder 52 adds the direct signal and the delay signal of the composite video signal with each other. A first sum signal output from the first adder 52 represents a correlation between the direct signal and the 1H delay signal of the composite video signal. The level of the first sum signal, i.e., a first correlation signal assigned to the composite video signal, lowers in proportion to an amount of the correlation. For example, an "n"th horizontal line signal and its 1H prior signal, i.e., an "n−1"th horizontal line signal.

The first correlation signal is applied to a first rectifier 54 through a first band pass filter (referred to as BPF hereafter) 56. The first rectifier 54 rectifies the first correlation signal so that a first DC correlation signal is obtained. The first DC correlation signal is applied to a control terminal of the first controllable resistor 50.

The 1H delay signal of the composite video signal from the first 1H delayer 24a is applied to a second comb filter consisting of a second 1H delayer 24b and a second subtractor 38. The second 1H delayer 24b delays the 1H delay signal of the composite video signal by 1H period. The output of the second 1H delayer 24b, i.e., the 2H delay signal of the composite video signal is applied to the second subtractor 38. The second subtractor 38 carries out a subtraction between the 1H delay signal and the 2H delay signal of the composite video signal. A second difference signal output from the second subtractor 38 is applied to a second controllable resistor 58 which will be described later. The second difference signal represents a second signal of the chrominance signal C component.

Further the 1H delay signal and the 2H delay signal of the composite video signal are applied to a second adder 60. The second adder 60 adds the 1H delay signal and the 2H delay signal of the composite video signal with each other. A second sum signal output from the second adder 60 represents a correlation between the 1H delay signal and the 2H delay signal of the composite video signal. The level of the second sum signal, i.e., a second correlation signal assigned to the composite video signal lowers in proportion to an amount of the correlation. For example, an "n−1"th horizontal line signal and its 1H prior signal, i.e., an "n−2"th horizontal line signal.

The second correlation signal is applied to a second rectifier 62 through a second BPF 64. The second rectifier 62 rectifies the second correlation signal so that a second DC correlation signal is obtained. The second DC correlation signal is applied to a control terminal of the second controllable resistor 58.

The first and second controllable resistors 50 and 58 attenuate the first and second signals of the chrominance signal C component from the first and second subtractors 36 and 38, in proportion to the first and second DC correlation signals, respectively. Outputs of the first and second controllable resistors 50 and 58 are coupled in common to a buffer 66. Thus, the first and second signals of the chrominance signal C component are integrated by the buffer 66. The output of the buffer 66 is passed through a third BPF 68 as an integrated signal of the chrominance signal C component. The integrated signal of the chrominance signal C component is then output through a C output terminal 30. Further the integrated signal of the chrominance signal C component is applied to a third subtractor 44 which will be described later.

Now assuming the "n−1"th and the "n−2"th horizontal line signals have a high correlation with each other than the correlation between the "n"th and the "n−1"th horizontal line signals, the first signal of the chrominance signal C component from the first subtractor 36 dominates in the input of the buffer 66 over the second signal of the chrominance signal C component from the second subtractor 38. Whereas the second signal of the chrominance signal C component dominates in the input of the buffer 66 over the first signal of the chrominance signal C component, when the "n"th and the "n−1"th horizontal line signals have a high correlation with each other than the correlation between the "n−1"th and the "n−2"th horizontal line signals. Thus, the correlations of the three adjacent horizontal line signals reflect well on the integrated signal of the chrominance signal C component.

Further the integrated signal of the chrominance signal C component is applied to the third subtractor 44. The 1H delay signal of the composite video signal from the first 1H delayer 24a is also applied to the third subtractor 44 through a timing adjuster 70. Thus, the third subtractor 44 carries out a subtraction between the integrated signal of the chrominance signal C component from the third BPF 68 and the 1H delay signal of the composite video signal. The chrominance signal C component of the 1H delay signal of the composite video signal is offset by the integrated signal of the chrominance signal C component in the third subtractor 44. Thus, only the luminance signal Y component is left in the composite video signal. The luminance signal Y component thus left is output through a Y output terminal 28.

As described above, the first conventional Y/C separation circuit, which employs a single 1H delayer (see FIG. 1), is capable of determining whether the composite video signals on two adjacent horizontal scanning lines have a correlation with each other. Further, the second, third and fourth conventional Y/C separation circuits which employ two 1H delayers (see FIGS. 2, 3, 4) are capable of certainly reducing cross-color distortion and dot disturbance and especially, as far as the dot disturbance is concerned, they have a very satisfactory characteristic.

However, these conventional Y/C separation circuits have problems, such as high cost and deterioration of the S/N ratio and horizontal resolution. The deterioration of the S/N ratio and horizontal resolution are caused by the 1H delayers. That is, in the second, third and fourth examples as shown in FIGS. 2, 3 and 4, the luminance signal Y component is inevitably derived from the composite video signal passing through the first 1H delayer 24a.

Here the luminance signal Y component is requested to have a sufficiently wide frequency band and a high S/N ratio. Therefore, the 1H delayers in the conventional Y/C separation circuits are required to use charge coupled devices (referred as to CCD devices, hereafter) for satisfying the wide frequency band and the high S/N ratio. However, the S/N ratio of the CCD devices is not sufficient for satisfying the quality of display images desired in recent high-definition video systems.

The clock frequency for operating a wide band CCD device is as high as, e.g., 14 MHz. Therefore, the upper frequency of the signal capable of passing through the CCD device is limited to 5 to 6 MHz. The same may be true when a digital memory is used. The upper frequencies, i.e., 5 to 6 MHz, are equivalent to the horizontal resolutions of 400 to 480 lines. In recent television receivers with a wide screen, the horizontal resolution of the input video signal is heightened to 600 lines or above. However, such a high horizontal resolution cannot be achieved by the conventional Y/C separation circuits described above.

Furthermore, such a wide band CCD device is very expensive and therefore, there was such a problem in that the cost would become extremely high in comparison to a case where a comb filter which allows the chrominance signal C component only to pass through the 1H delayer was adopted.

In the conventional Y/C separation circuits of FIGS. 2, 3 and 4, three adjacent horizontal line signals, i.e., the "n"th, "n−1"th and "n−2"th horizontal line signals from the input terminal 26, the first and second 1H delayers 24a and 24b are operated to derive the chrominance signal C component. However, malfunctions may possibly occur due to the low band luminance signal Y component contained in the output of the 1H delayers. So, in order to perform the operation in the frequency band of the chrominance signal C (3 to 4 MHz, in case of NTSC signal) only, a BPF (not shown in FIGS. 2, 3 and 4) is provided for limiting the frequency band of the composite video signal. Here, as described above, the luminance signal Y component inevitably passes through such 1H delayers. Thus, it is not possible to locate a common BPF in a position prior the 1H delayers. Thus, three BPFs must be used for the three adjacent line signals. This necessity of three BPFs also causes the cost to increase.

SUMMARY OF THE INVENTION

It is, therefore, an object of the present invention to provide a Y/C separation circuit which is capable of getting a sufficient S/N ratio and high horizontal resolution in the inexpensive construction.

In order to achieve the above object, a Y/C separation circuit for separating Y and C components of a composite video signal having a horizontal scan period, according to one aspect of the present invention, includes an input circuit for receiving the composite video signal, a first delay which receives a composite video signal and delays the composite video signal by an amount equal to an integer times the horizontal scan period, a second delay which receives the delayed output signal from the first delay and delays delayed output signal by an amount equal to an integer plus one times the horizontal scan period, a C component extraction circuit which receives the composite video signal and the output from the first and second delays and outputs a C component signal representing the C component of the composite video signal and a Y component extraction circuit which receives the composite video signal from the input circuit and the C component signal from the C component extraction circuit and generates a Y component signal representing the Y component of the composite video signal by subtracting the C component signal from the composite video signal.

Additional objects and advantages of the present invention will be apparent to persons skilled in the art from a study of the following description and the accompanying drawings, which are hereby incorporated in and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
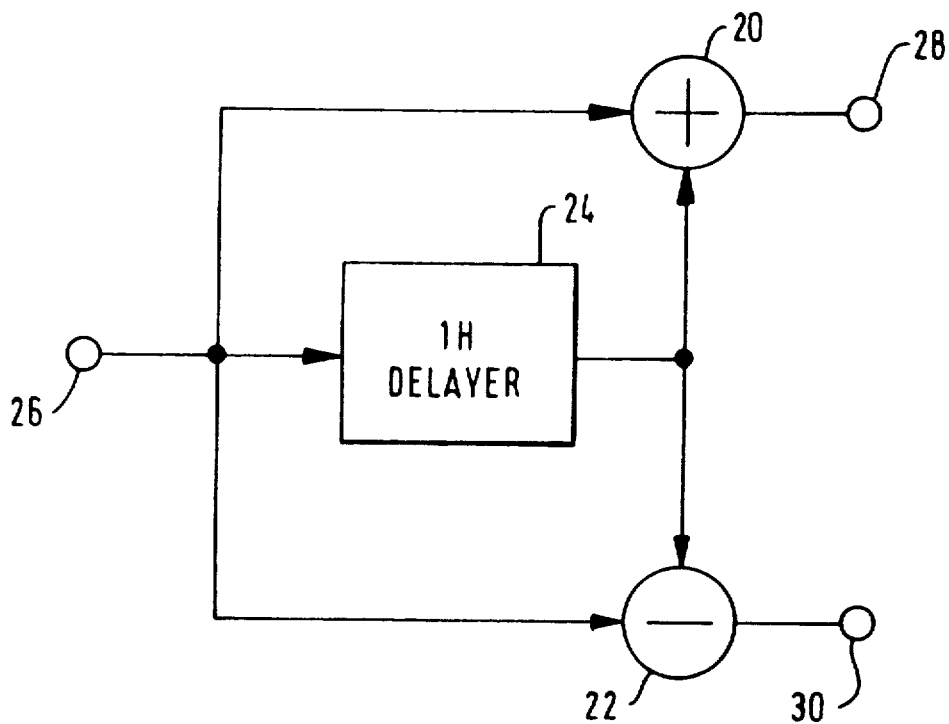
FIGS. 1, 2, 3, and 4 are block diagrams showing four typical examples of conventional Y/C separation circuits.

The present invention will be described in detail with reference to the FIGS. 5 through 16. Throughout the drawings, reference numerals or letters used in FIGS. 1 through 4 will be used to designate like or equivalent elements for simplicity of explanation.

Figure 5:
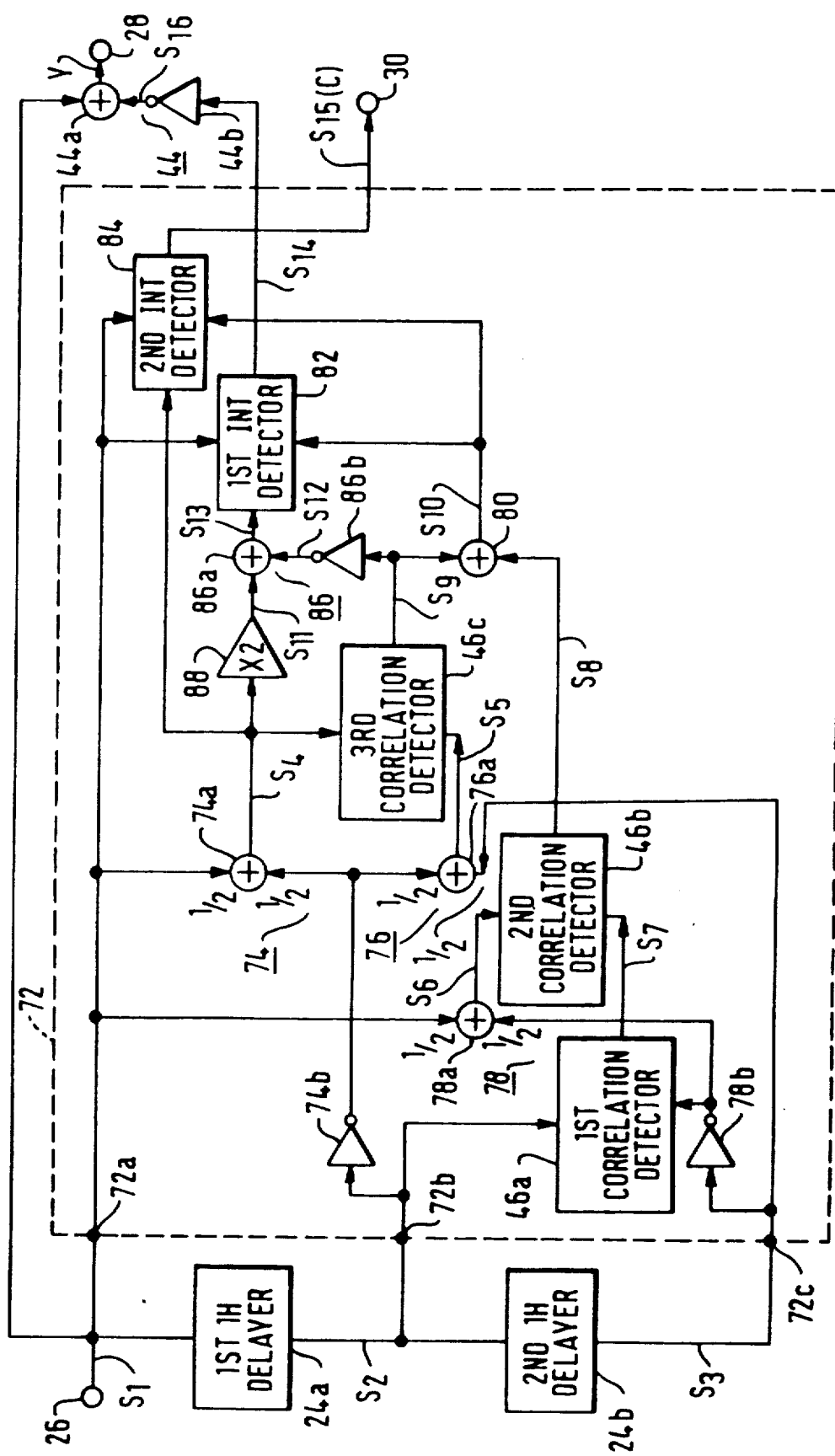
FIG. 5 is a block diagram showing a first embodiment of the Y/C separation circuit according to the present invention.
Figure 6:
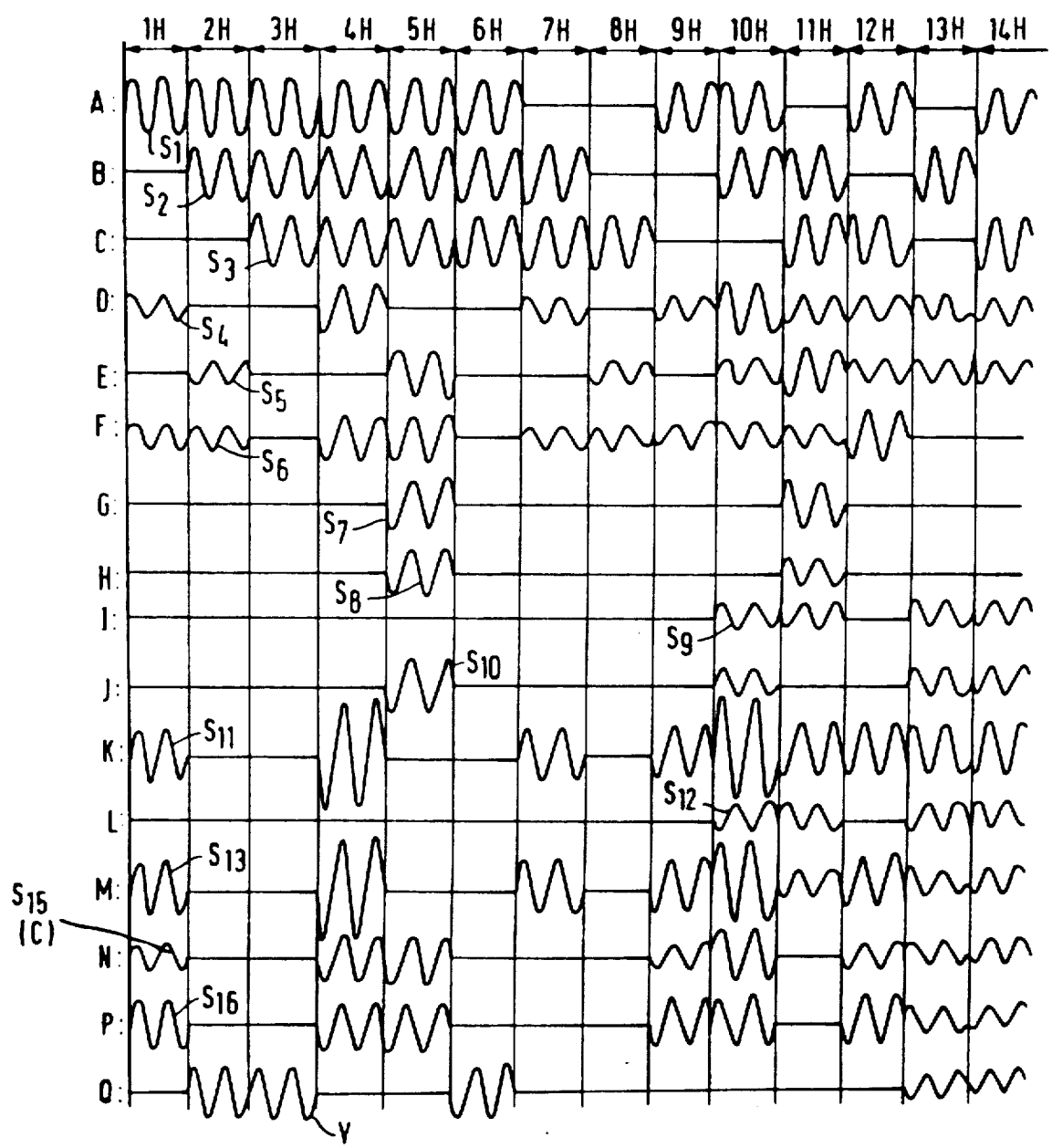
FIGS. 6 and 7 are timing charts for explaining the operation of the Y/C separation circuit of FIG. 5.
Figure 7:
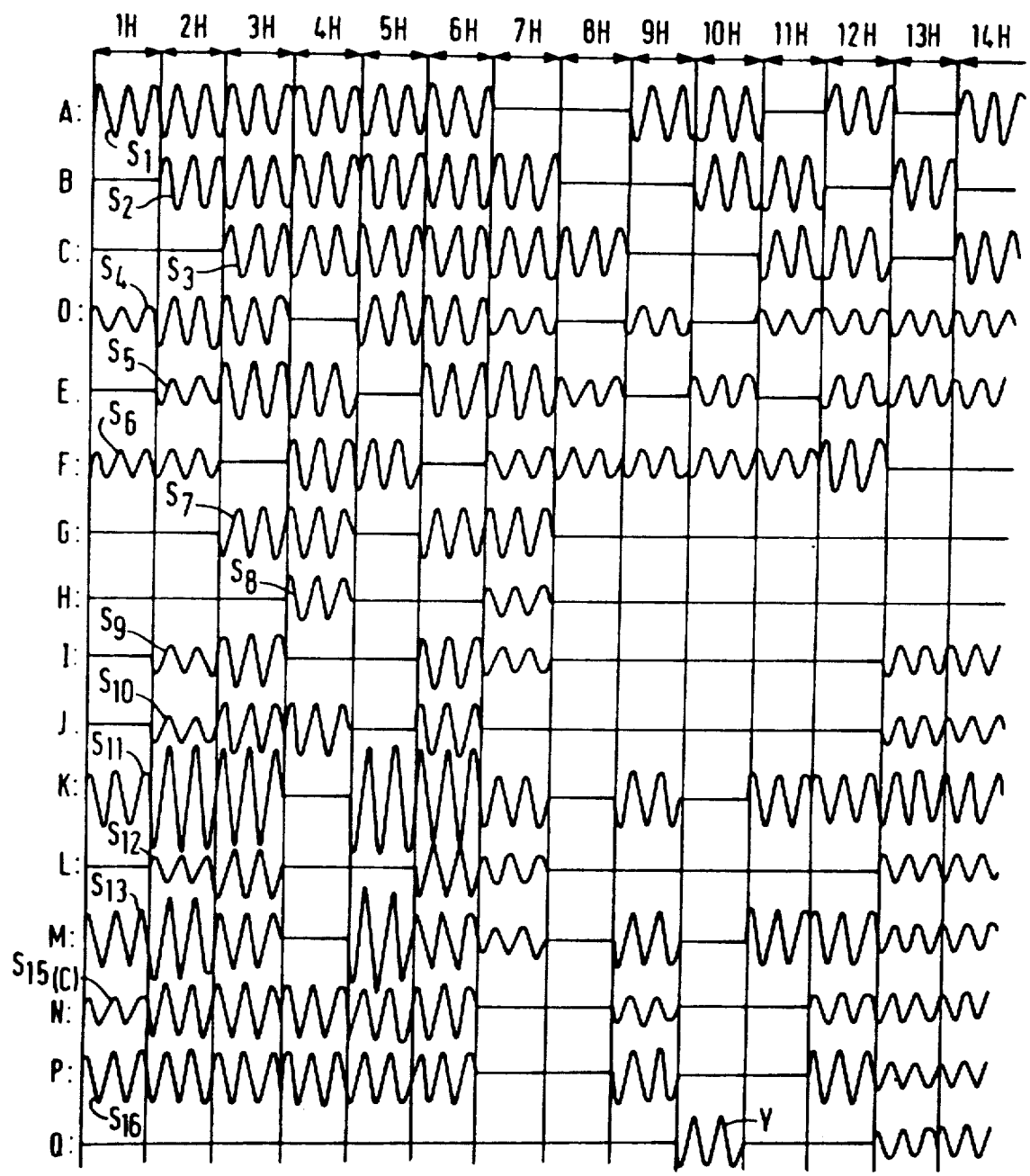

Referring now to FIGS. 5 through 7, a first embodiment of the Y/C separation circuit according to the present invention will be described in detail. FIG. 5 shows a block diagram of the first embodiment of the Y/C separation circuit. FIGS. 6 and 7 show waveform diagrams of signals in the circuit of FIG. 5, for two exemplary cases regarding the composite video signal.

In FIG. 5, a composite video signal input to an input terminal 26 of the Y/C separation circuit is directly applied to the a first 1H delayer 24a, a processor 72 for extracting a chrominance signal C component through a first processor inlet 72a and a first subtractor 44 for outputting a luminance signal Y. The signal S1, as shown in FIG. 6A, will be referred to as a direct signal of the composite video signal hereafter. The first subtractor 44 consists of a first adder 44a and a first inverter 44b, as described later. The first 1H delayer 24a delays the direct signal S1 of the composite video signal by 1H period so that a 1H delay signal S2, as shown in FIG. 6B, of the composite video signal is obtained therefrom. The 1H delay signal S2 of the composite video signal is applied to the processor 72 through a second processor inlet 72b and a second 1H delayer 24b. The second 1H delayer 24b further delays the 1H delay signal S2 of the composite video signal by 1H period. Thus, a 2H delay signal S3, as shown in FIG. 6C, is obtained therefrom. The 2H delay signal S3 of the composite video signal is applied to the processor 72 through a third processor inlet 72c.

These three signals S1, S2 and S3 of the composite video signal represent three adjacent horizontal line signals, e.g., the "n"th, "n−1" and "n−2"th horizontal line signals. The references S1, S2 and S3 will also be used for the "n"th, "n−1" and "n−2"th three adjacent horizontal line signals in this description. Thus, the "n"th, "n−1" and "n−2"th line signals S1, S2 and S3 are simultaneously applied to the processor 72.

In the processor 72, the "n"th and "n−1"th line signals S1 and S2 on the first and second inlets 72a and 72b are applied to a second subtractor 74 through the first and second inlets 72a and 72b. Here the second subtractor 74 consists of a second adder 74a and a second inverter 74b. The second subtractor 74 carries out a subtraction between the "n"th line signal S1 and the "n−1"th line signal S2. Thus, a first difference signal S4, as shown in FIG. 6D, is obtained therefrom. This first difference signal S4 represents a first signal of the chrominance signal C component. Because the first 1H delayer 24a and the second subtractor 74 in the processor 72 are combined in a comb filter configuration (see FIG. 1).

Further the "n−1"th line signal S2 and the "n−2"th line signal S3 are applied to a third subtractor 76 through the second and third inlets 72b and 72c. Here the third subtractor 76 consists of a third adder 76a and the second inverter 74b. That is, the second inverter 74b is used in common for the second subtractor 74 and the third subtractor 76. The third subtractor 76 carries out a subtraction between the "n−1"th line signal S2 and the "n−2"th line signal S3. Thus, a second difference signal S5, as shown in FIG. 6E, is obtained therefrom. This second difference signal S5 represents a second signal of the chrominance signal C component. Because the second 1H delayer 24b and the third subtractor 76 in the processor 72 are also combined in the comb filter configuration.

Further the "n"th line signal S1 and the "n−2"th line signal S3 are applied to a fourth subtractor 78 through the first and third inlets 72a and 72c. Here the fourth subtractor 78 consists of a fourth adder 78a and a third inverter 78b. The fourth subtractor 78 carries out a subtraction between the "n"th line signal S1 and the "n−2"th line signal S3. Thus, a third difference signal S6, as shown in FIG. 6F, is obtained therefrom. This third difference signal S6 represents a third signal of the chrominance signal C component. Because the series of the first and second 1H delayers 24a and 24b and the fourth subtractor 78 in the processor 72 are also combined in the comb filter configuration.

Here, the signals applied to the second, third and fourth adders 74a, 76a and 78a in the second, third and fourth subtractors 74, 76 and 78 are assumed to be halved in amplitude by suitable level halving circuits (not shown).

Further the "n−1"th line signal S2 and the "n−2"th line signal S3 are applied to a first correlation detector 46a through the second and third inlets 72b and 72c. The first correlation detector 46a detects a correlation between the "n−1"th line signal S2 and the "n−2"th line signal S3. Thus the first correlation detector 46a outputs a first correlation signal S7. When these two line signals S2 and S3 have the same polarity, the first correlation signal S7 follows the one signal of the two line signals S2 and S3 with a lesser amplitude. As seen from the above description, this situation corresponds to the case of the chrominance signal C component. When these two line signals S2 and S3 are opposite in phase, the output of the first correlation detector 46a, i.e., the first correlation signal S7 is suppressed. This situation corresponds to the case of the luminance signal Y component. Thus when the composite video signal or the "n"th line signal S1 presents the waveform, as shown in FIG. 6A, the first correlation signal S7 shows the waveform, as shown in FIG. 6G. The first correlation signal S7 is then applied to a second correlation detector 46b.

The second correlation detector 46b also receives the third difference signal S6 from the fourth subtractor 78. The second correlation detector 46b detects a correlation between the third difference signal S6 and the first correlation signal S7. The output of the second correlation detector 46b, i.e., a second correlation signal S8, as shown in FIG. 6H, is applied to a fifth adder 80.

On the other hand, the first and second difference signals S4 and S5 from the second and third subtractors 74 and 76 are applied to a third correlation detector 46c. The third correlation detector 46c detects a correlation between the first and second difference signals S4 and S5. The output of the third correlation detector 46c, i.e., a third correlation signal S9, as shown in FIG. 6I, is also applied to the fifth adder 80.

The fifth adder 80 adds the second and third correlation signals S8 and S9. The output of the fifth adder 80, i.e., a sum signal S10, as shown in FIG. 6J, is also applied to a first and second intermediate value detectors (referred to as INT detector hereafter), which will be described later.

Further the first difference signal S4 from the second subtractor 74 and the third correlation signal S9 from the third correlation detector 46c are applied to a fifth subtractor 86, which consists of a sixth adder 86a and a fourth inverter 86b. The first difference signal S4 is applied to the sixth adder 86a through a doubler 88, while the third correlation signal S9 is applied to the sixth adder 86a through the fourth inverter 86b. The doubler 88 doubles the amplitude of the first difference signal S4 for matching the first difference signal S4 with the level of the third correlation signal S9. The output of the doubler 88, i.e., a double amplitude signal S11 is shown in FIG. 6K, while an inverted signal S12, i.e., the output of the fourth inverter 86b is shown in FIG. 6L. The fifth subtractor 86 carries out a subtraction between the double amplitude signal S11 from the doubler 88 and the third correlation signal S9 from the third correlation detector 46c. The output of the fifth subtractor 86, i.e., a fourth difference signal S13, as shown in FIG. 6M, is applied to the first INT detector 82.

The first INT detector 82 receives the "n"th line signal S1 through the first processor inlet 72a, in addition to the sum signal S10 and the fourth difference signal S13 from the fifth adder 80 and the fifth subtractor 86. Thus, the first INT detector 82 detects an intermediate value signal among the three signals S1, S10 and S13 applied thereto. The output of the first INT detector 82, i.e., a first intermediate signal S14 corresponds to the chrominance signal C component of the composite video signal, as described later. The first intermediate signal S14 is applied to the first subtractor 44.

Further the first difference signal S4 and the "n"th line signal S1 from the second subtractor 74 and the first inlet 72b are applied to the second INT detector 84, in addition to the sum signal S10 from the fifth adder 80. Thus, the second INT detector 84 detects an intermediate value signal among the three signals S1, S4 and S10 applied thereto. The output of the second INT detector 84, i.e., a second intermediate signal S15, as shown in FIG. 6N, also corresponds to the chrominance signal C component of the composite video signal. The second intermediate signal S15 is output as a separated chrominance signal C component through a C output terminal 30.

Again the first subtractor 44 consists of the first adder 44a and the first inverter 44b. The first intermediate signal S14 from the first INT detector 82 is applied to the first adder 44a through the first subtractor 44b. An inverted signal of the first intermediate signal S14, i.e., the output S16 of the first inverter 44b is shown in FIG. 6P. Then the output S16 of the first inverter 44b is added with the "n"th line signal S1 from the first processor inlet 72a. In other words, the first subtractor 44 carries out a subtraction between the composite video signal and the first intermediate signal S14 from the first INT detector 82 or the separated chrominance signal C component. Then the chrominance signal C components are offset each other from the composite video signal. Thus, only the luminance signal Y component is left in the composite video signal. The luminance signal Y component thus left, as shown in FIG. 6Q, is output through a Y output terminal 28.

The Y/C separation according to the first embodiment is achieved by using the characteristics that the luminance signal Y components in adjacent line signals have a relatively high correlation between them, while the chrominance signal C components in adjacent line signals have a relatively low correlation between them, as described in the above description. FIG. 6 shows a case in which the composite video signal to be processed has a high correlation among its horizontal line periods. FIG. 7 shows another case in which the composite video signal to be processed has a low correlation among its horizontal line periods. Here, FIGS. 7A through 7Q correspond to FIGS. 6A through 6Q.

For the case of FIG. 6, it is assumed that the composite video signal on the input terminal 26, i.e., the "n"th line signal S1 changes as shown in FIG. 6A. Then the waveforms of the three signals S1, S2 and S3 applied to the processor 72, i.e., the "n"th, "n−1"th and "n−2"th three adjacent line signals have relationships as shown in FIGS. 6A, 6B and 6C. When the three signals have high correlations with each other, like the second and third horizontal line (referred to as 2H and 3H etc. hereafter) periods, the first and second intermediate signals S14 and S15 are suppressed. In the 1H period where only the "n"th line signal S1 presents, the second intermediate signal S15 has a half level of the "n"th line signal S1. In the 4H period where the "n"th line signal S1 has a low correlation to the "n−1"th and "n−2"th line signals S2 and S3, the "n"th line signal S1 is output through the second INT detector 84 as the second intermediate signal S15, i.e., the chrominance signal C component to be derived from the C output terminal 30.

On and after the 7H period, the correlations among the three signals S1, S2 and S3 are relatively low. This situation occurs by fine images in the vertical direction. In such a case, it is impossible to correctly carry out the Y/C separation. However, the embodiment of FIG. 5 generates half level signals of the chrominance signal C component and the luminance signal Y component in such situation, i.e., the fine images in the vertical direction, in particular for fine images where the composite video signal only lasts for a very short period, e.g., for single horizontal period. Thus, the embodiment of FIG. 5 prevents leaks of the the chrominance signal C component and the luminance signal Y component which inevitably occurred in the conventional circuits.

The embodiment of FIG. 5 is remarkably different from the conventional circuit of FIG. 1 in leakages of signals at non-composite video signal portions. That is, in the 7H period of such non-composite video signal states a signal leakage occurs in the output of the second subtractor 74. This signal leakage causes the so-called color dullness and is extremely conspicuous on the screen because there is no image pattern, if the signal leakage is brought to the outputs of the first and second INT detectors 82 and 84. In this embodiment, however, the signal leakage is suppressed by the first and second INT detectors 82 and 84.

For the case of FIG. 7, it is assumed that the composite video signal on the input terminal 26, i.e., the "n"th line signal S1 changes as shown in FIG. 7A. For example, the composite video signal applied to the input terminal 26, i.e., the "n"th line signal S1 has the 2.5 cycle per 1H period so that the composite video signal has a low correlation in the vertical direction. In the case of FIG. 7A the phase of the composite video signal is reversed every horizontal line period from the 1H through 6H periods, while a non-composite video signal state occurs prior the 1H period. Thus the second INT detector 84 outputs a half level signal in the 1H period. In the 2H through 6H periods where the "n"th line signals S1 has a low correlation to the "n−1"th and "n−2"th line signals S2 and S3, the "n"th line signal S1 is output through the second INT detector 84 as the second intermediate signal S15, i.e., the chrominance signal C component to be derived from the C output terminal 30. On the other hand, the first INT detector 82 outputs the full level signal as the "n"th line signal S1 in the 1H period. Here the second subtractor 74 outputs a half level signal of the "n"th line signal S1 because the second subtractor 74 and the first 1H delayer 24a has the comb filter configuration in similar to the conventional circuit of FIG. 1. Thus, the second subtractor 74 itself causes a leakage of the chrominance signal C component onto the luminance signal Y component causing dot disturbance. In this embodiment of FIG. 5, however, the "n"th line signal S1, i.e., the direct signal of the composite video signal is applied to the first subtractor 44. Also the first INT detector 82 applies the first intermediate signal S14 the same level as the "n"th line signal S1 in the 1H period. Thus the leakage of the chrominance signal C component from the second subtractor 74 is suppressed by the first subtractor 44.

On and after the 7H period, also the correlations among the three signals S1, S2 and S3 are relatively low in similar to the situation of FIG. 6. In such a case, it is also impossible to correctly carry out the Y/C separation. However, the embodiment of FIG. 5 prevents leaks of the the chrominance signal C component and the luminance signal Y component which inevitably occurred in the conventional circuits.

In the 7H period of such non-composite video signal states at the situation of FIG. 7, a signal leakage also occurs in the output of the second subtractor 74. In this embodiment of FIG. 5, however, the signal leakage is suppressed by the first and second INT detectors 82 and 84.

Figure 2:
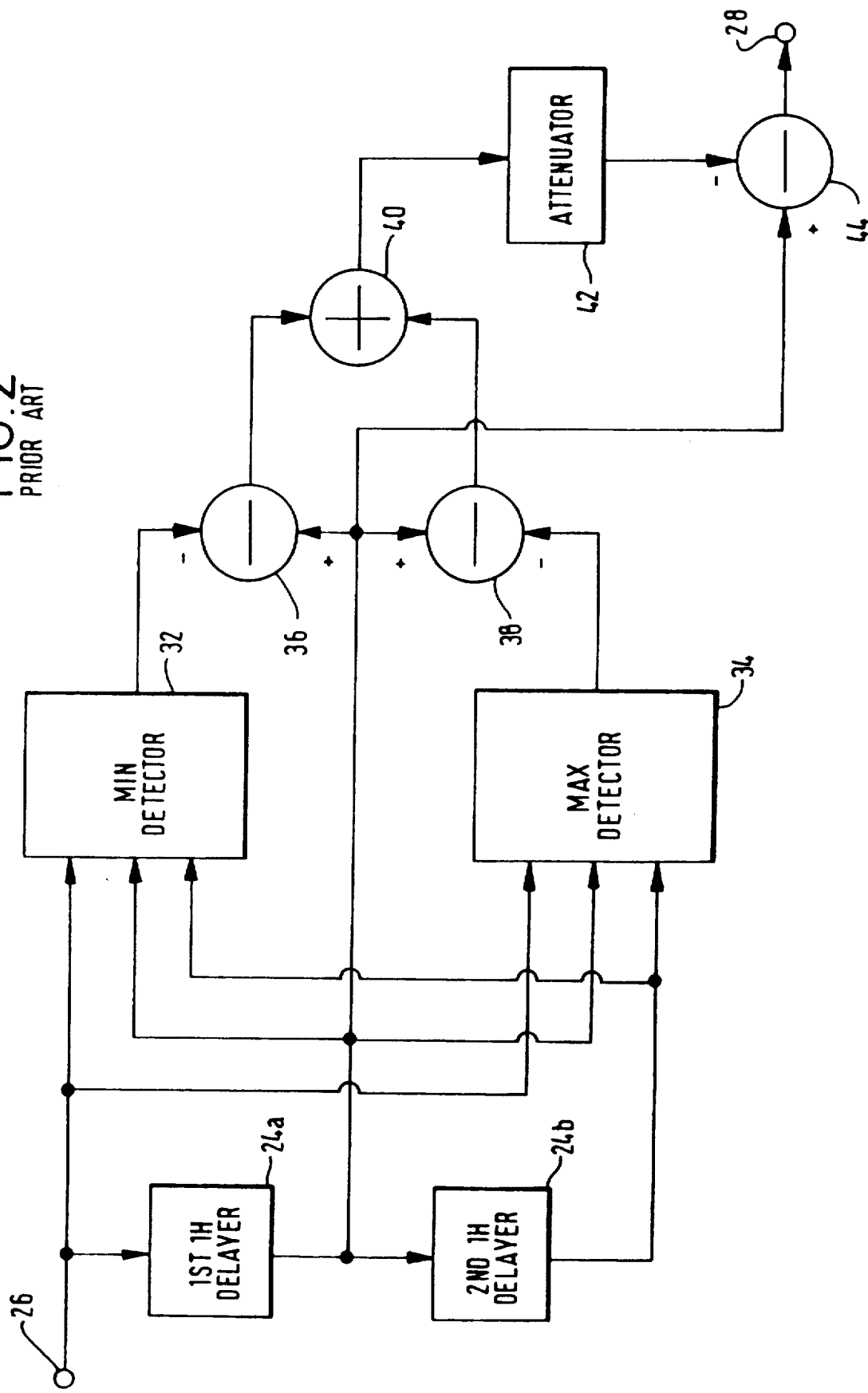
Figure 3:
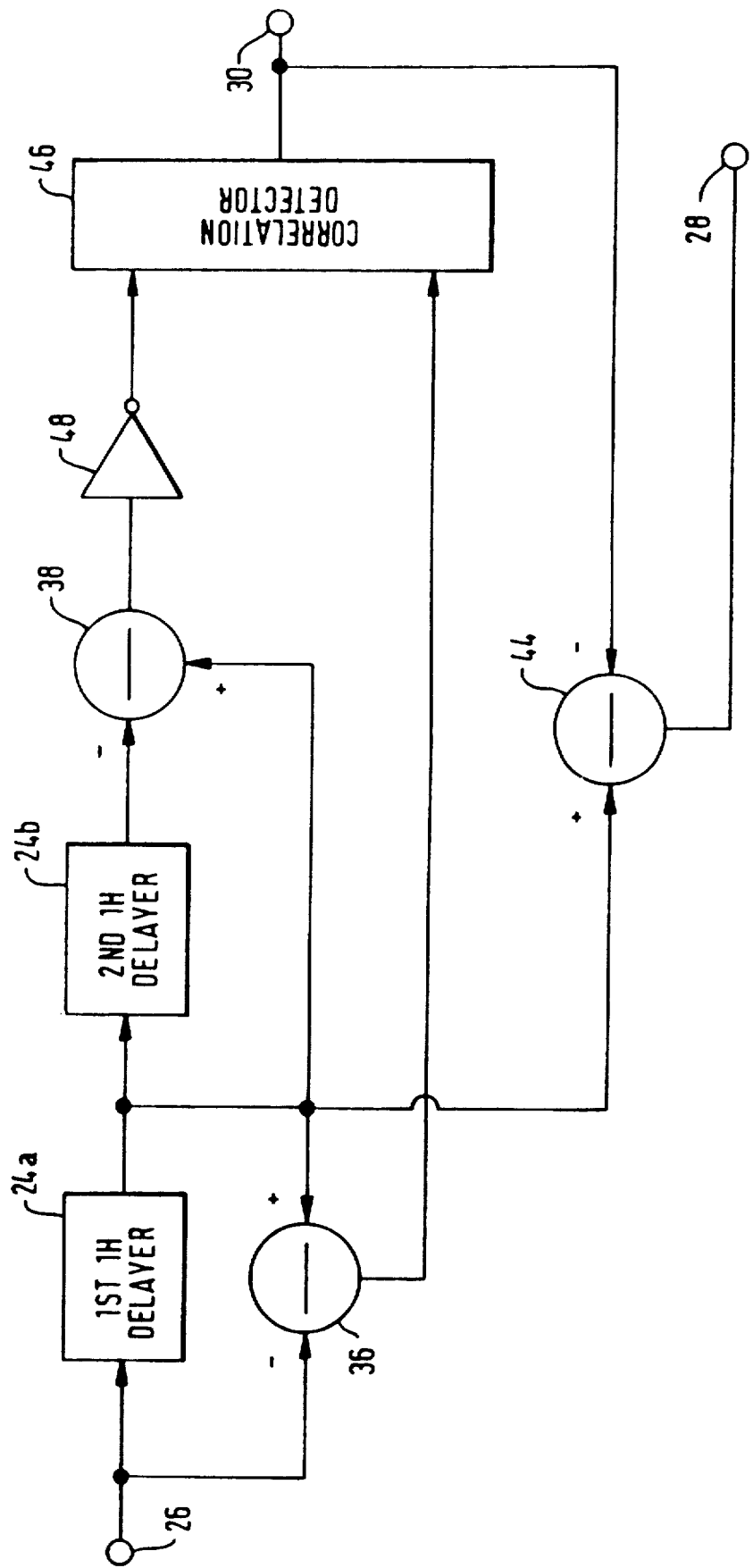
Figure 4:
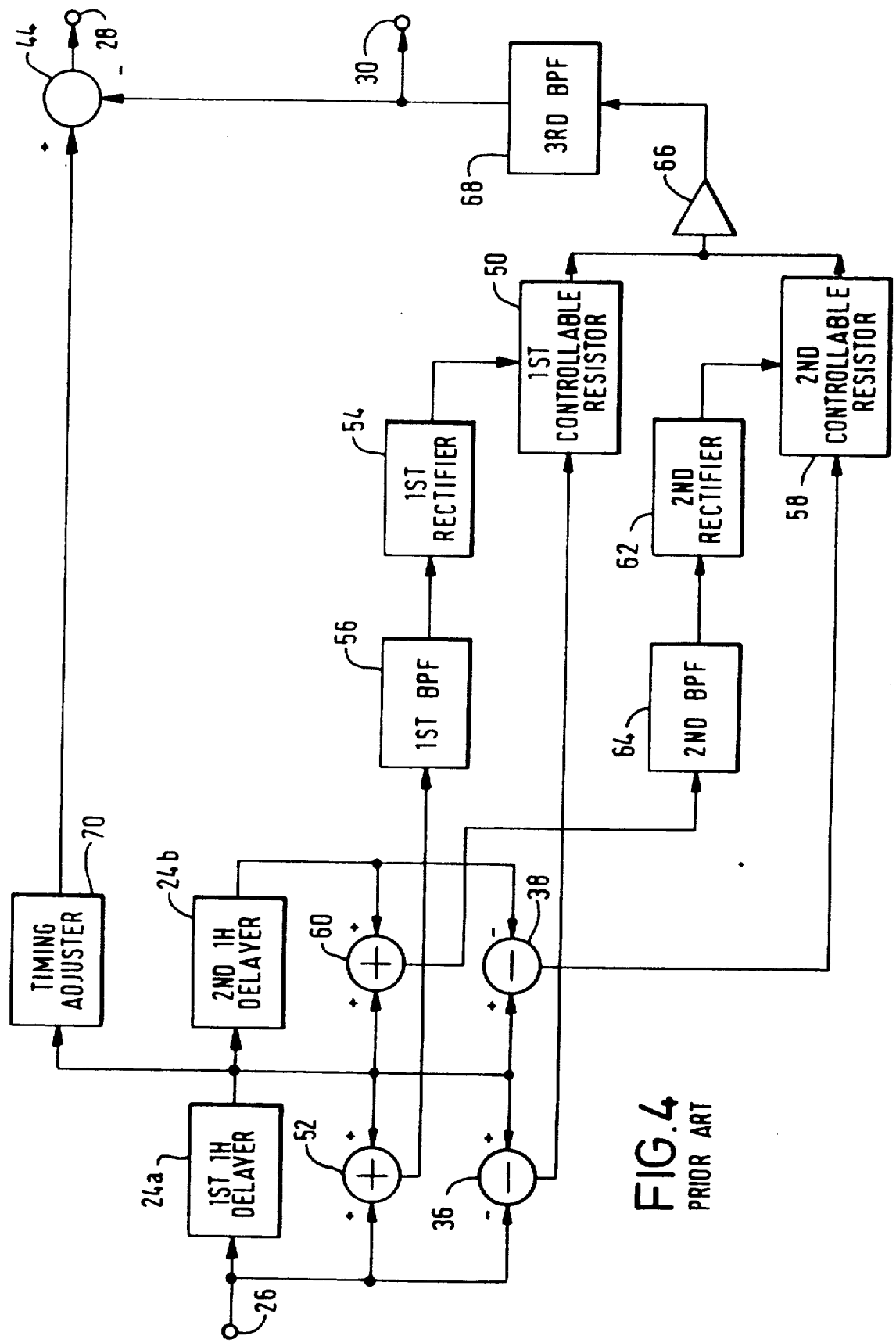

Thus, the effective Y/C separation as shown by the examples of the conventional circuits in FIGS. 2, 3 and 4 is possible in this embodiment. Furthermore, in this embodiment, the direct signal of the composite signal is applied to the first subtractor, as described above, without passing through the 1H delayers 24a and 24b and the luminance signal Y component is taken out without passing through the 1H delayers 24a and 24b. In the circuits shown in FIGS. 2, 3 and 4, the chrominance signal C component is delayed from input video signals by 1H period. As clearly seen from FIGS. 6 and 7, the chrominance signal C component is not delayed in the processor 72. Accordingly, differing from the conventional circuit example, it is not necessary to get the luminance signal Y using the output of the 1H delayer.

Thus, in this embodiment the reduction of the S/N ratio by the 1H delayer will not occur. Because the luminance signal Y component does not pass through any 1H delayer. In addition, the horizontal resolution will not be limited because of limitations of bandwidth limitations of the 1H delayer. Furthermore, it is only required that the 1H delayers delay signals in the chrominance signal C band. Thus, it is sufficient for the 1H delayer to have a pass band ranging 3-4 MHz. Therefore, inexpensive delay devices such as a glass-wire delay device, etc. can be used.

Figure 8:
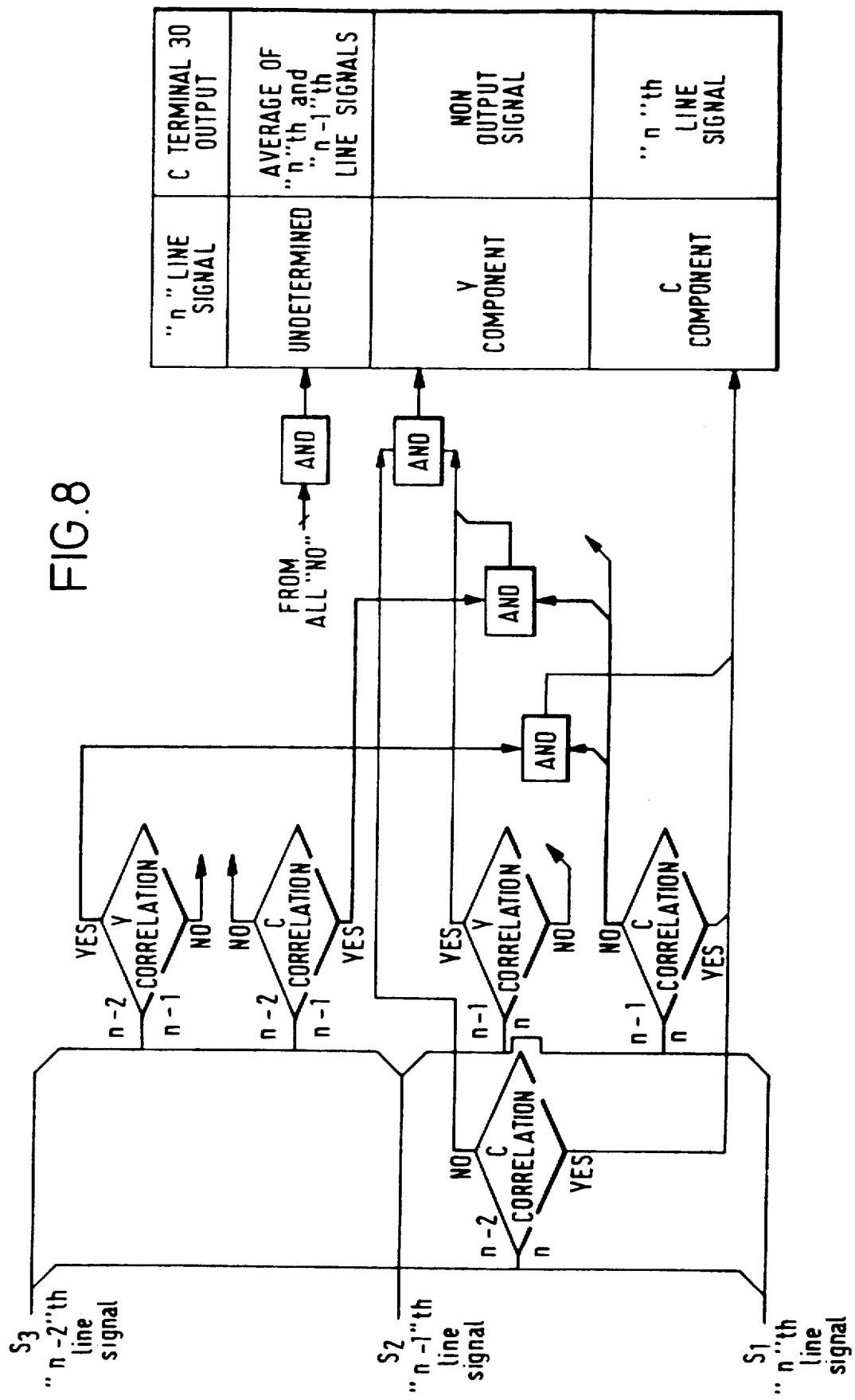
FIG. 8 is a flow diagram showing the operation algorithm of the Y/C separation circuit of FIG. 5.

Referring now to FIG. 8, an operation algorithm of the Y/C separation circuit according to the present invention. In the flow diagram, as shown in FIG. 8, heavy lines particularly indicate operation flows at a time that a pattern of the pictures changes significantly. Such a case corresponds to, for example, portions between the 3H-4H periods and the 9H-10H periods of FIGS. 6 and 7.

Figure 9:
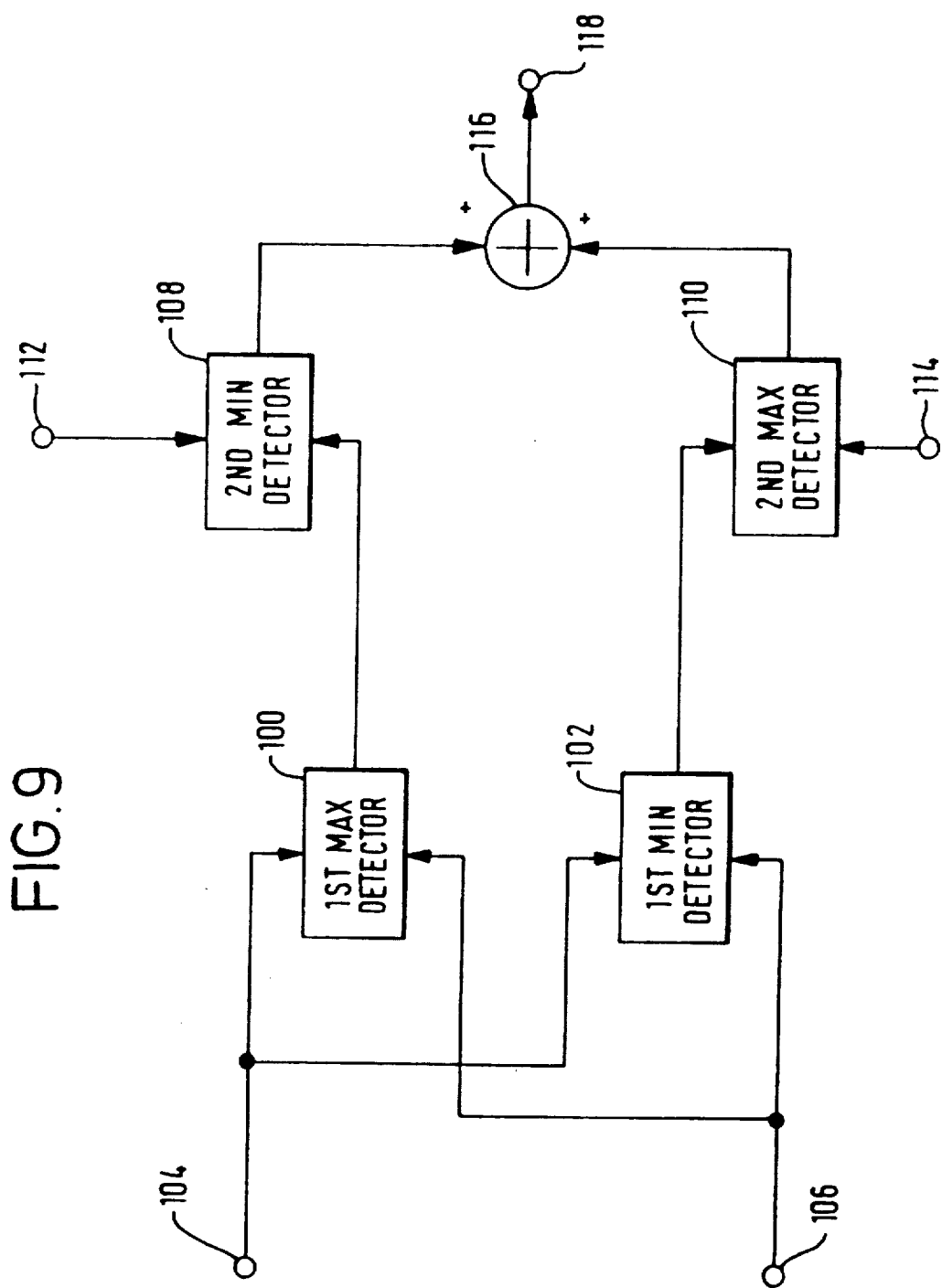
FIG. 9 is a block diagram showing the correlation detector shown in FIG. 5.

FIG. 9 shows the detail of a typical correlation detector which may be used for the first, second and third correlation detectors 46a, 46b and 46c of FIG. 5.

In FIG. 9, two signals are applied to a first MAX detector 100 and a first MIN detector 102 through input terminals 104 and 106, respectively. The first MAX detector 100 obtains the maximum value of its two inputs and supplies a first maximum value signal thus obtained to a second MIN detector 108. The first MIN detector 102 obtains the minimum value of two inputs and supplies a first minimum value signal thus obtained to a second MAX detector 110. First and second reference voltages are also applied to the second MIN circuit 108 and the second MAX detector 110 through first and second reference voltage terminals 112 and 114, respectively. The second MIN detector 108 obtains the minimum value of the maximum value signal output from the first MAX detector 100 and the first reference voltage. The second MAX detector 110 also obtains the maximum value of the minimum value signal output rom the first MIN detector 102 and the second reference voltage. A second minimum value signal thus obtained by the second MIN detector 108 and a second maximum value thus obtained by the second MAX detector 110 are applied to an adder 116. The adder 116 obtains the sum of the two signals, i.e., the second minimum and maximum signals. A sum signal thus obtained by the adder 116 is output through an output terminal 118.

Now, it is assumed that the two input signals to the correlation detector of FIG. 9 are opposite each other in polarity. In this case, the first MAX detector 100 outputs the maximum value signal of positive polarity and the first MIN detector 102 outputs the minimum value signal of negative polarity. If both the first and second reference voltages are set at zero (0) level, both the second MIN detector 108 and the second MAX detector 110 output zero (0) level signals. Therefore, the sum signal output through the output terminal 118 is at zero level.

On the other hand, the second MIN detector 108 outputs zero (0) level signal if its two input signals have the same polarity. At that time, the second MAX detector 110 outputs the lower level signal of its two input signals. Further, the second MIN detector 108 outputs the smaller amplitude level of its two input signals for the signal of negative signal and second MAX detector 110 outputs a zero (0) level signal. The adder 116 then outputs the smaller amplitude level signal of its two signals.

Figure 10:
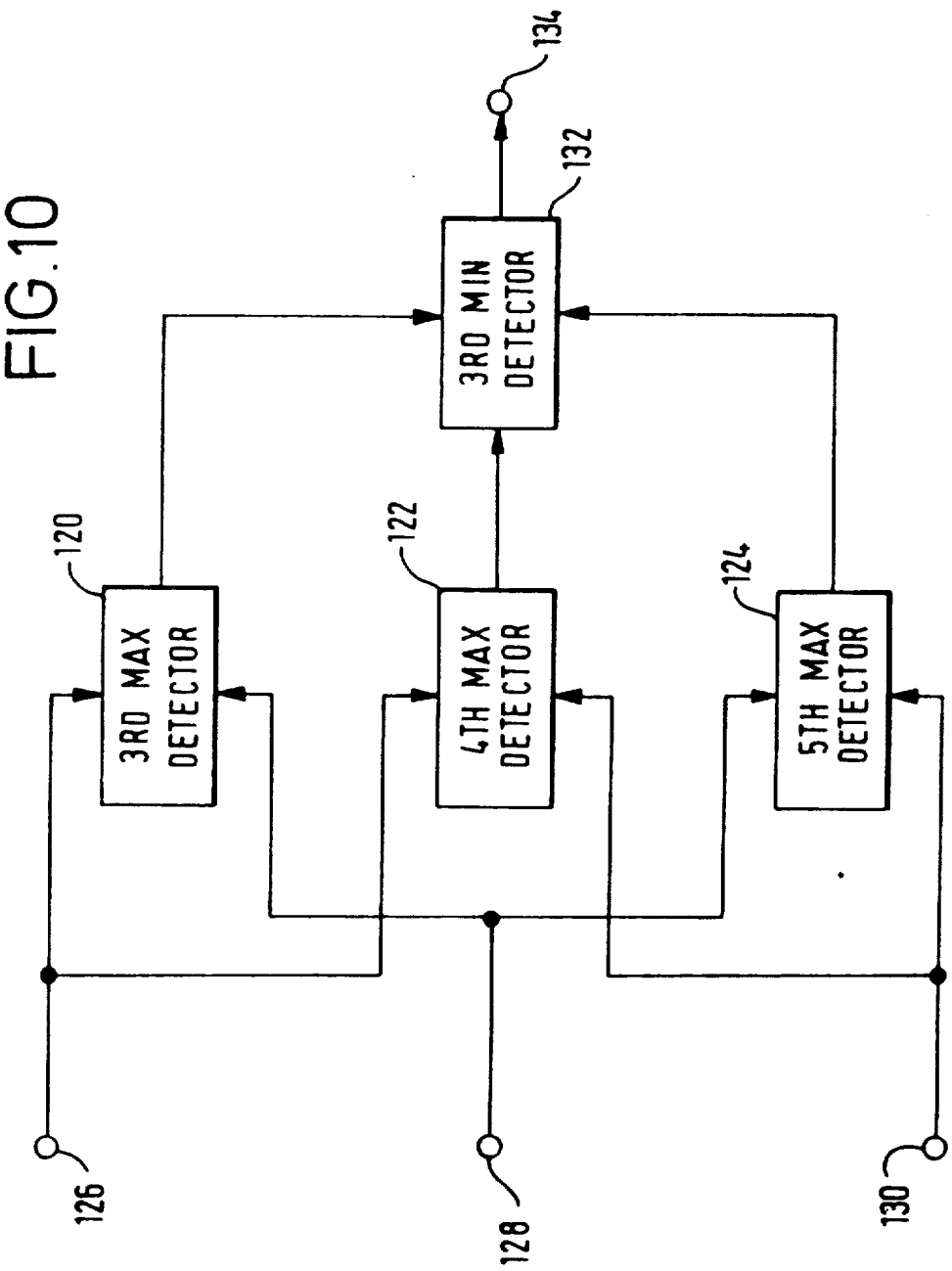
FIG. 10 is a block diagram showing the intermediate value circuit shown in FIG. 5.

FIG. 10 shows the detail of a typical INT detector which may be used for the first and second INT detectors 82 and 84 of FIG. 5.

In FIG. 10, three signals are applied to third, fourth and fifth MAX detectors 120, 122 and 124 through three input terminals 126, 128 and 130. The third MAX detector 120 obtains the maximum value of its two input signals through the first and second input terminals 126 and 128. The fourth MAX circuit 122 obtains the maximum value of its two input signals through the first and third input terminals 126 and 130. The fifth MAX detector 124 obtains the maximum value of its two input signals through the second and third input terminals 128 and 130. Three maximum value signals thus obtained by the three MAX detectors 120, 122 and 124 are applied to a third MIN detector 132. The third MIN detector 132 obtains the minimum value of these three maximum value signals. A minimum value signal thus obtained by the third MIN detector 132 represents the intermediate level signal of the three maximum value signals. If two of the three maximum value signals are at the same level, these two maximum value signals equally become the minimum value of the signals applied to the third MIN detector 132. Thus, the third MIN detector 132 outputs the intermediate value signal of the three inputs. If more than the two input signals are the same level, the third MIN detector 132 outputs the signal of that level.

Figure 11:
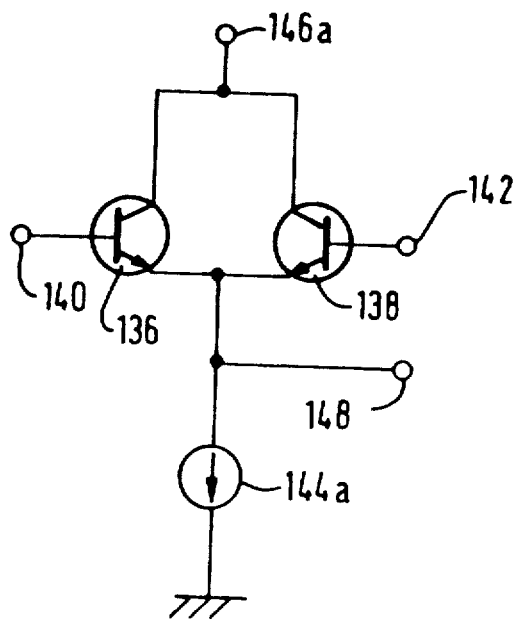
FIG. 11 is a circuit diagram showing the MAX detector shown in FIGS. 9 and 10.

FIG. 11 shows the detail of a typical MAX detector which may be used for the MAX detectors 100, 110, 120, 122 and 124 of FIGS. 9 and 10.

In FIG. 11, two input signals are applied to bases of two NPN transistors 136 and 138 through two input terminals 140 and 142. The NPN transistors 136 and 138 are coupled each other in a differential pair configuration. That is, their emitters are connected in common to a reference potential source through a current source 144a. Their collectors are coupled to a power source 146a. An output terminal 148 is led from the common node of the emitters. Thus, either signal with the maximum value of the two input signals appears to the common node of the emitters. Then the maximum value signal is output through the output terminal 148.

Figure 12:
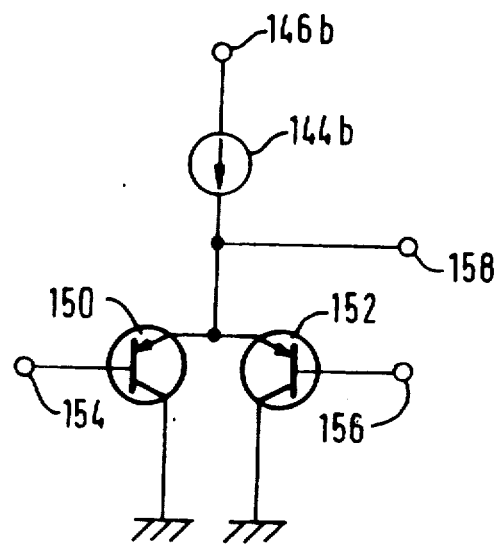
FIG. 12 is a circuit diagram showing the MIN detector shown in FIG. 9.

FIG. 12 shows the detail of a typical two-input type MIN detector which may be used for the MIN detectors 102 and 108 of FIG. 9.

In FIG. 12, two input signals are applied to bases of two PNP transistors 150 and 152 through two input terminals 154 and 156. The PNP transistors 150 and 152 are coupled each other in a differential pair configuration. That is, their emitters are connected in common to a power source 146b through a current source 144b. Their collectors are coupled to a reference potential source. An output terminal 158 is led from the common node of the emitters. Thus, either signal with the minimum value of the two input signals appears to the common node of the emitters. Then the minimum value signal is output through the output terminal 158.

Figure 13:
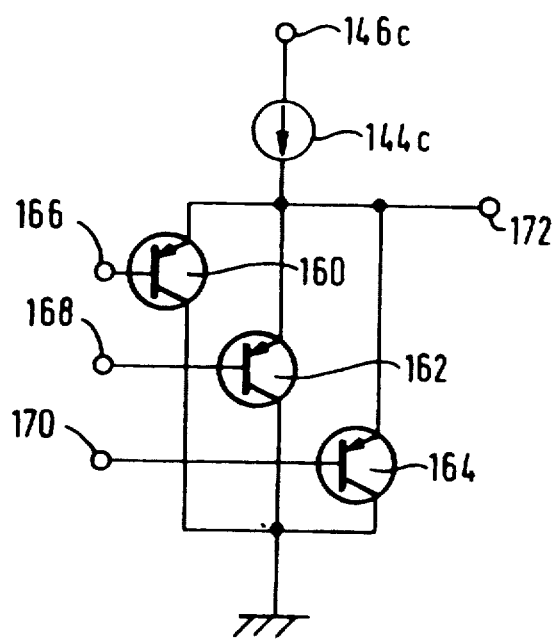
FIG. 13 is a circuit diagram showing the MIN detector of three inputs shown in FIG. 10.

FIG. 13 shows the detail of a typical three-input type MIN detector which may be used for the MIN detector 132 of FIG. 10.

In FIG. 13, three input signals are applied to bases of three PNP transistors 160, 162 and 164 through three input terminals 166, 168 and 170. The three PNP transistors 160, 162 and 164 are coupled each other in a differential configuration. That is, their emitters are connected in common to a power source 146c through a current source 144c. Their collectors are coupled to a reference potential source. An output terminal 172 is led from the common node of the emitters. Thus, either signal with the minimum value of the three input signals appears to the common node of the emitters. Then the minimum value signal is output through the output terminal 172.

Figure 14:
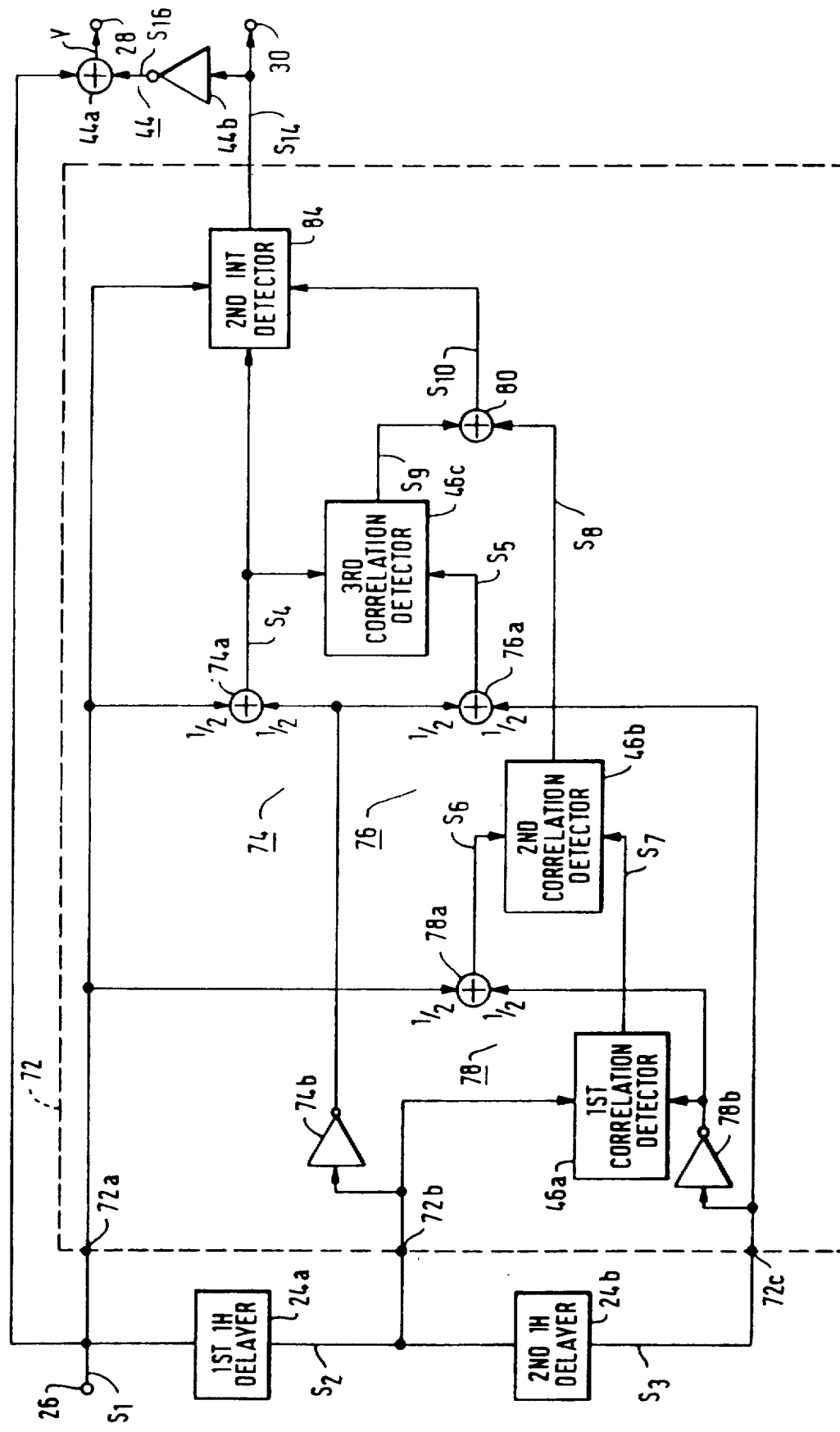
FIG. 14 is a block diagram showing a second embodiment of the present invention.

Referring now to FIG. 14, a second embodiment of the present invention will be described. In FIG. 14, elements equivalent to those of FIG. 5 are assigned with the same reference numerals as those of FIG. 5 and the explanations for the equivalent elements will be omitted hereinafter.

The second embodiment differs from the first embodiment shown in FIG. 5 in that the doubler 88, the fifth subtractor 86 and the first INT detector 82 in FIG. 5 are omitted from the second embodiment. Thus, the signal output from the second subtractor 74 is applied to only both the second INT detector 84 and the third correlation detector 46c. The signal output from the third correlation detector 46c is applied to only the fifth adder 80. The signal output from the fifth adder 80 is applied to only the second INT detector 84.

In the second embodiment, the chrominance signal C component obtained by the second INT detector 84 is applied to the first subtractor 44, instead the other chrominance signal C component obtained by the first INT detector 82. Other operations are all the same as the first embodiment of FIG. 5.

According to the second embodiment, as shown in FIG. 13, the dot disturbance characteristic is somewhat deteriorated when compared the first embodiment of FIG. 5. However, the second embodiment advantageously has the simple circuit configuration which can certainly reduce the cross-color distortion.

Figure 15:
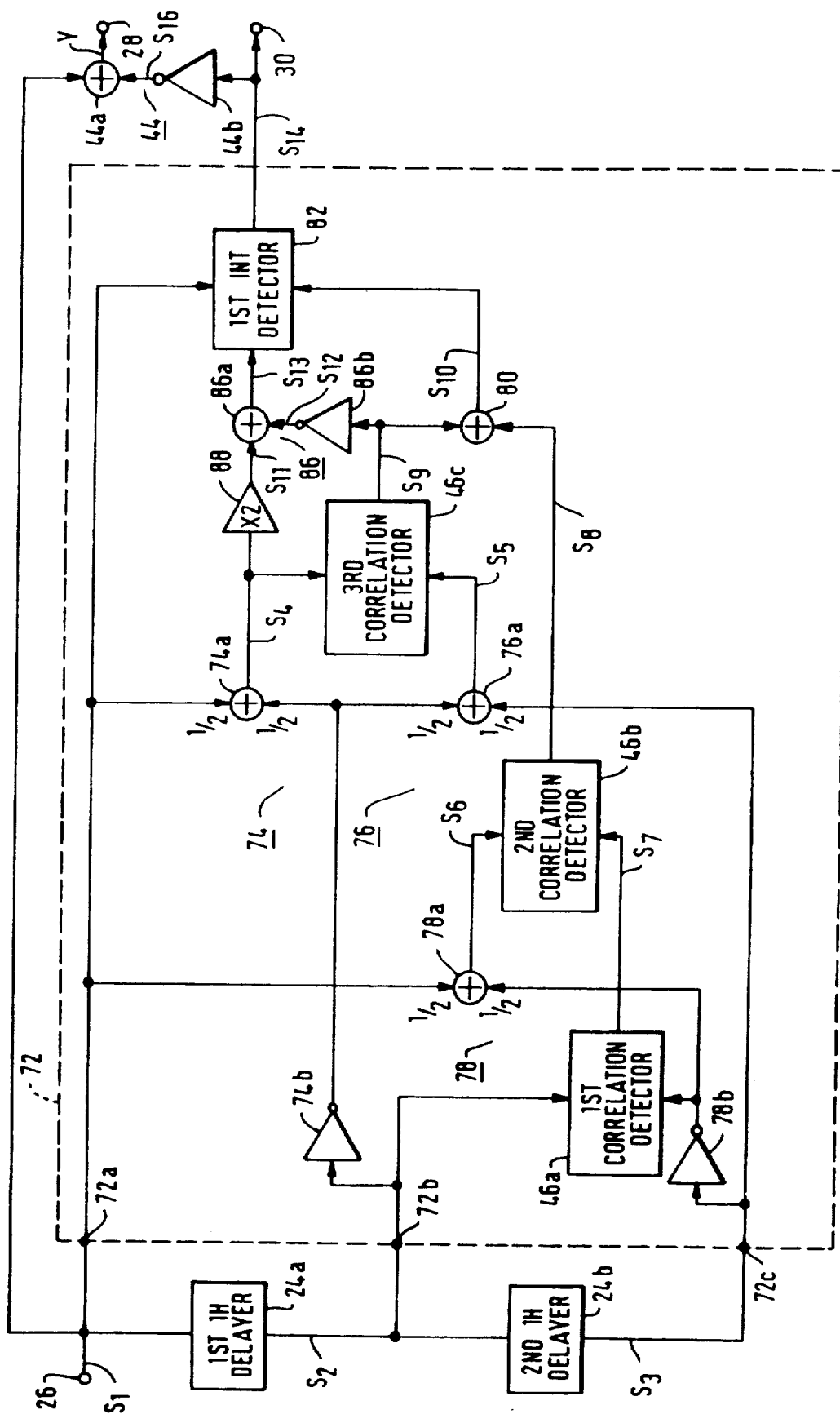
FIG. 15 is a block diagram showing a third embodiment of the present invention.

FIG. 15 shows a third embodiment of the present invention. In FIG. 15, elements equivalent to those of FIG. 5 are also assigned with the same reference numerals as those of FIG. 5 and the explanations for the equivalent elements will be omitted hereinafter.

The third embodiment differs from the first embodiment of FIG. 5 in that the second INT detector 84 shown in FIG. 5 is omitted from the third embodiment. Thus, the first signal of the chrominance signal C component obtained by the first INT detector 82 is output through the C output terminal 30, instead the second chrominance signal C component obtained by the second INT detector 84. Other operations are all the same as the first embodiment of FIG. 5.

According to the third embodiment, as shown in FIG. 14, it advantageously has the simple circuit configuration which can certainly reduce the dot disturbance.

Figure 16:
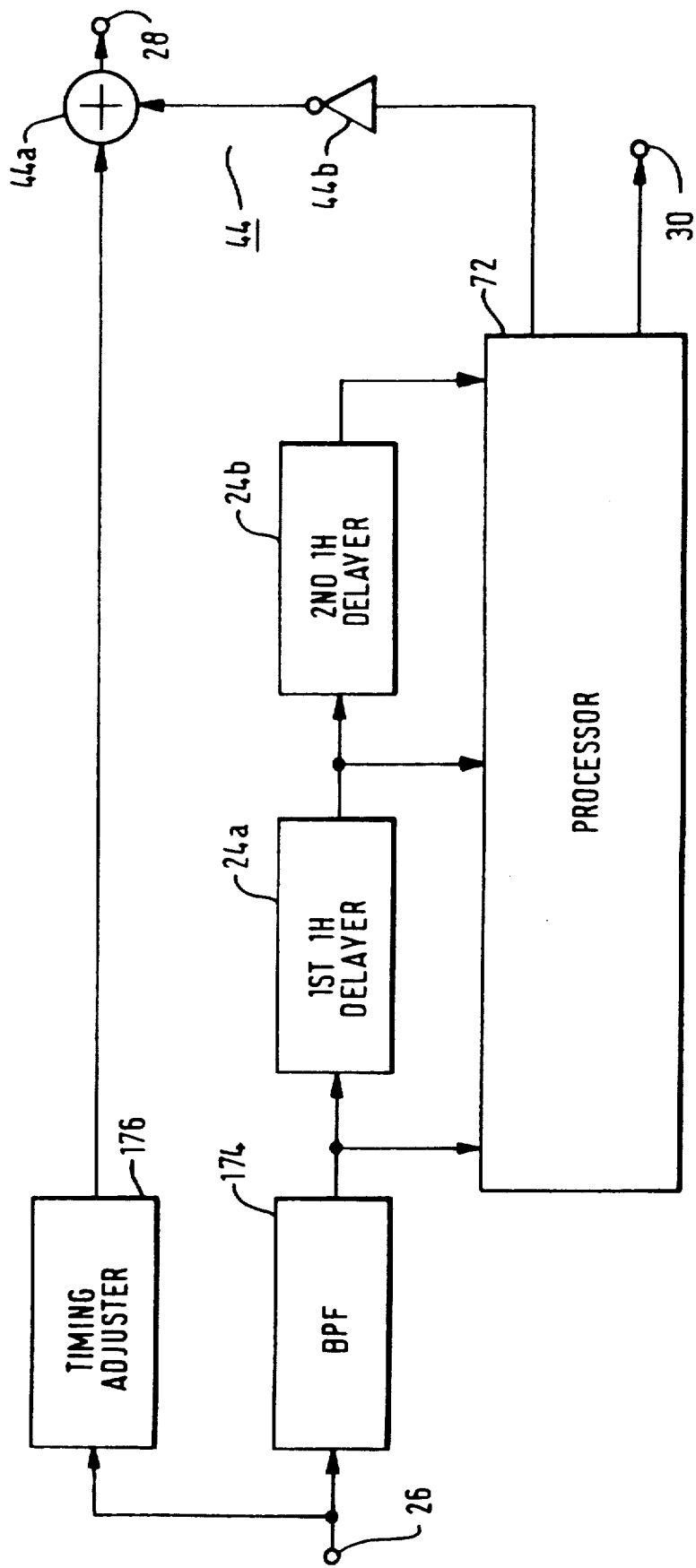
FIG. 16 is a block diagram showing the arrangement of the band pass filter.

In the above three embodiments, as shown in FIGS. 5, 14 and 15, each of the resultant luminance signal Y component in the composite video signal does not pass through any delay means such as the first and 1H delayers 24a and 24b. Therefore, it is possible to arrange a band pass filter at the forward stage of the first 1H delayer 24a to give only the chrominance signal C band component the processor 72, as shown in FIG. 16. FIG. 16 shows a modification for illustrating the use of the band pass filter.

In FIG. 16, the composite video signal is applied to both the first 1H delayer 24a and the processor 72 through a band pass filter 174. The processor 72 can be embodied by any circuit, as shown in FIGS. 5, 13 and 14. Thus, the processor 72 is herein represented by a block for simplification of explanation.

Further the composite video signal is applied to the first subtractor 44 through a timing adjuster 176. The timing adjuster 176 is used for adjusting the timings of the luminance signal Y component and the chrominance signal C component, the former bypassing the 1H delayers 24a and 24b and the processor 72 while the latter passing them. Thus, the timing adjuster 176 can be a simple delay device. Because timing adjuster 176, i.e., the delay device can only delay the luminance signal Y component by, for example, about 200 to 300 ns.

Thus, it is sufficient to provide only one band pass filter 176. Further, as the low band component of the composite video signal does not pass through the 1H delayers 24a and 24b, the voltage range of the composite video signal passing through the 1H delayers 24a and 24b is relatively narrow. More further the center voltage of the chrominance signal C component is kept in relatively stable. Because of this, even when a CCD device is adopted for the 1H delayer, any deterioration of the gain differentiation characteristic and the phase differentiation characteristic of the chrominance signal C component are suppressed.

As described above, the present invention can provide an extremely preferable Y/C separation circuit.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention include all embodiments falling within the scope of the appended claims.

What is claimed is:

1. A Y/C separation circuit for separating the Y and C components of a composite video signal having a horizontal scan period, comprising:

input means for receiving the composite video signal;

a first delay means for receiving the composite video signal and for delaying the composite video signal by an amount equal to an integer times the horizontal scan period;

a second delay means for receiving the delayed composite video signal from the first delay means and for delaying the delayed composite video signal by an amount equal to an integer times the horizontal scan period;

C component extraction means for receiving the composite video signal from the input means, the delayed composite video signal from the first delay means, and the twice delayed composite video signal from the second delay means and for outputting a C component signal representing the C component of the composite video signal; and Y component extraction means for receiving the composite video signal from the input means and the C component signal from the C component extraction means and for generating a Y component signal representing the Y component of the composite video signal by subtracting the C component signal from the composite video signal.

2. A Y/C separation circuit of claim 1, wherein the integer is one.

3. A Y/C separation circuit for separating the Y and C components of a composite video signal having a horizontal scan period, comprising:

input means for receiving the composite video signal;

a first delay means for receiving the composite video signal and for delaying the composite video signal by an amount equal to an integer times the horizontal scan period;

a second delay means for receiving the delayed composite video signal from the first delay means and for delaying the delayed composite video signal by an amount equal to an integer times the horizontal scan period;

C component extraction means for receiving the composite video signal from the input means, the delayed composite video signal from the first delay means, and the twice delayed composite video signal from the second delay means and for outputting a C component signal representing the C component of the composite video signal; and Y component extraction means for receiving the composite video signal from the input means and the C component signal from the C component extraction means and for generating a Y component signal representing the Y component of the composite video signal by subtracting the C component signal from the composite video signal;

wherein the C component extraction means comprises:

a first subtraction circuit which subtracts the delayed composite video signal from the input composite video signal;

a second substraction circuit which subtracts the twice delayed composite video signal from the input composite video signal;

a third subtraction circuit which subtracts the delayed composite video signal from the twice delayed composite video signal;

a first correlation detecting circuit which detects any correlation between the delayed composite video signal and the twice delayed composite video signal;

a second correlation detecting circuit which detects any correlation between the output of the first correlation detecting circuit and the output of the second subtraction circuit;

a third correlation detecting circuit which detects any correlation between the outputs of the first and third subtraction circuits;

a summing circuit which outputs the sum of the outputs of the second and third correlation circuits; and a first intermediate value detection circuit which outputs the intermediate value of the composite video signal, the output of the first subtraction circuit and the output of the summing circuit as the C component signal.

4. A Y/C separation circuit for separating the Y and C components of a composite video signal having a horizontal scan period, comprising:

input means for receiving the composite video signal;

a first delay means for receiving the composite video signal and for delaying the composite video signal by an amount equal to an integer times the horizontal scan period;

a second delay means for receiving the delayed composite video signal from the first delay means and for delaying the delayed composite video signal by an amount equal to an integer times the horizontal scan period;

C component extraction means for receiving the composite video signal from the input means, the delayed composite video signal from the first delay means, and the twice delayed composite video signal from the second delay means and for outputting a C component signal representing the C component of the composite video signal; and Y component extraction means for receiving the composite video signal from the input means and the C component signal from the C component extraction means and for generating a Y component signal representing the Y component of the composite video signal by subtracting the C component signal from the composite video signal;

wherein the C component extraction means comprises:

a first subtraction circuit which subtracts the delayed composite video signal from the input composite video signal;

a second subtraction circuit which subtracts the twice delayed composite video signal from the input composite video signal;

a third subtraction circuit which subtracts the delayed composite video signal from the twice delayed composite video signal;

a first correlation detecting circuit which detects any correlation between the delayed composite video signal and the twice delayed composite video signal;

a second correlation detecting circuit which detects any correlation between the output of the first correlation detecting circuit and the output of the second subtraction circuit;

a third correlation detecting circuit which detects any correlation between the outputs of the first and third subtraction circuits;

a summing circuit which outputs the sum of the outputs of the second and third correlation circuits; and a fourth subtraction circuit which subtracts the output of the first subtraction circuit and the output of the third correlation circuit; and a first intermediate value detection circuit which outputs the intermediate value of the composite video signal, the output of the fourth subtraction circuit and the output of the summing circuit as the C component signal.

5. A Y/C separation circuit of claim 4, wherein the C component extraction means also comprises a second intermediate value detection circuit which outputs the intermediate value of the composite video signal, the output of the first subtraction circuit and the output of the summing circuit as the C component signal.

6. A method of separating the Y and C components from a composite video signal having a horizontal scan period, comprising:

delaying the composite video signal by an integer times the horizontal scan period;

delaying the delayed composite video signal by an additional integer times the horizontal scan period;

combining the composite video signal, the delayed composite video signal, and the twice delayed composite video signal to extract the C component of the composite video signal; and subtracting the C component from the undelayed composite video signal to obtain the Y component of the video signal.

7. A method of claim 6, wherein the integer is one.

* * * * *

UNITED STATES PATENT AND TRADEMARK OFFICE
CERTIFICATE OF CORRECTION

PATENT NO. : 5,099,315

DATED : March 24, 1992

INVENTOR(S) : Takashi Koga et al.

It is certified that error appears in the above-identified patent and that said Letters Patent is hereby corrected as shown below:

Abstract, line 10, change "integral" to --integer--.

Signed and Sealed this

Twenty-sixth Day of October, 1993

*Attest:*

BRUCE LEHMAN

*Attesting Officer*   *Commissioner of Patents and Trademarks*